Oct. 27, 1964 T. ROTH 3,153,844
METHOD OF MAKING SPRING LEAVES
Filed Dec. 7, 1960 2 Sheets-Sheet 1

Inventor
Theodor Roth
BY W. F. Wagner
Attorney

Oct. 27, 1964  T. ROTH  3,153,844
METHOD OF MAKING SPRING LEAVES
Filed Dec. 7, 1960  2 Sheets-Sheet 2
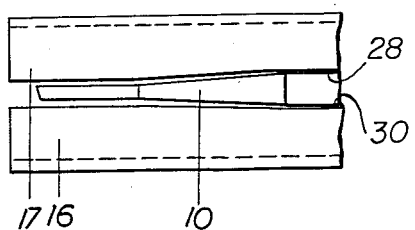
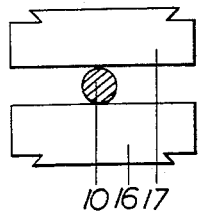
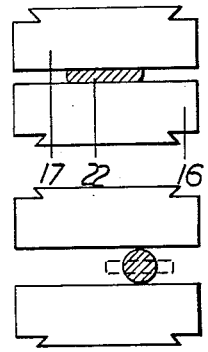
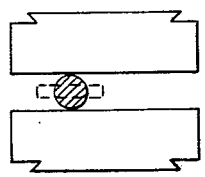
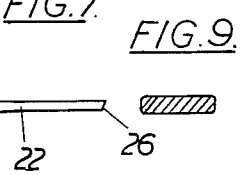
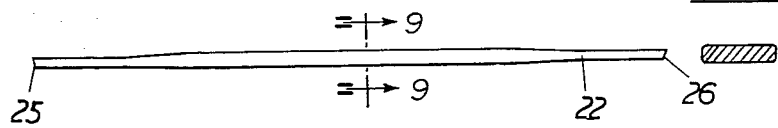
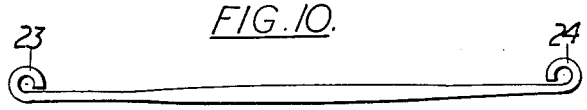
Inventor
Theodor Roth
BY
W. F. Wegner
Attorney United States Patent Office 3,153,844
Patented Oct. 27, 1964

3,153,844
METHOD OF MAKING SPRING LEAVES
Theodor Roth, Mainz-Bretzenheim, Germany, assignor to Adam Opel Aktiengesellschaft, Russelsheim (Main), Germany, a German company
Filed Dec. 7, 1960, Ser. No. 74,417
Claims priority, application Germany Dec. 24, 1959
2 Claims. (Cl. 29—173)

The invention relates to a method of making spring leaves.

The method according to the invention is economical in the use of heat and time and yields spring leaves of improved resistance to fatigue.

According to the invention, the method of making a spring leaf comprises forming the leaf from a bar to the required shape and dimensions in a die under pressure.

The leaf may be formed from a heated bar of rectangular cross-section tapered towards an end and the leaf formed to the required tapered shape and dimensions in a die under pressure.

Furthermore, the bar may be of circular cross-section and be tapered towards an end portion which is of uniform minimum cross-section, and that portion formed flat in a die to a uniform thickness so that it may subsequently be incurved to form a spring eye.

The scope of the invention is defined by the appended claims; and how it can be performed is hereinafter particularly described with reference to the accompanying drawings in which:

FIGURE 3 is a part side elevation of a bar in the press;

FIGURE 4 is an end elevation, partly in section, of the parts shown in FIGURE 3;

FIGURE 5 is an end elevation partly in section of the bar in the press at the end of the forming of the spring leaf;

FIGURES 6 and 7 are end elevations of the press showing alternative positions of a bar;

FIGURE 8 is a side elevation of a spring leaf made by the method according to the invention;

FIGURE 9 is a cross-section of the leaf on the line 9—9 in FIGURE 8; and

FIGURE 10 is a side elevation of the spring leaf of FIGURE 8 with eyes made by the method according to the invention.

Figure 1:
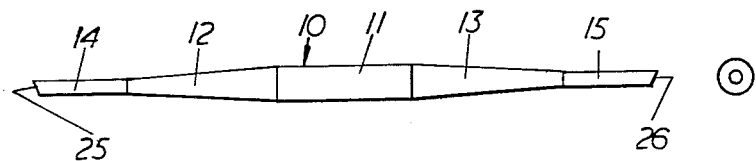
FIGURE 1 is a side elevation of a bar from which a spring leaf can be formed by the method according to the invention.
Figure 2:
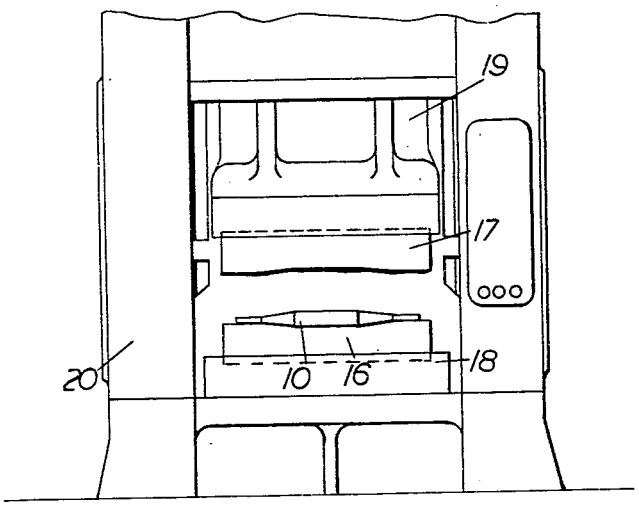
FIGURE 2 is a front elevation of a forging press by which the leaf is formed.

A cylindrical bar of rolled steel stock is machined so as to taper the bar 10 from a central cylindrical portion 11, as shown in FIGURE 1 at 12 and 13, towards each end and also to form two cylindrical end portions 14 and 15 of minimum diameter, one adjacent each end of the bar. Accurate diameters along the length of the bar are achieved by the machining and surface cracks and scale are removed. Each end of the bar is cut off obliquely as at 25 and 26.

The bar is then heated to forging temperature and then formed to the required shape and dimensions between parts 16 and 17 of a die in a forging press 20 (FIGURES 2, 3, 4 and 5). The lower part 16 of the die is mounted on a support 18 and the upper part 17 on a plunger 19 of the press 20.

As seen best in FIGS. 4, 5, 6 and 7, the shape of the die parts 16 and 17 provide no lateral or longitudinal confinement. However, in side elevational view, parts 16 and 17 are formed with opposing longitudinally contoured profiles 28 and 30 which form the bar into a spring leaf 22 tapered in thickness towards each end, and having two portions of minimum uniform thickness, one adjacent each end of the leaf as shown in FIGURES 8 and 9.

The time for the forging operation is short and the heat loss is small so that spring eyes 23, 24 (FIGURE 10) are formed by incurving the end portions of the leaf 22 without further re-heating. A satisfactory closure of the eyes is ensured by the oblique ends 25 and 26. The spring leaf is then re-heated and hardened and tempered.

FIGURES 6 and 7 show positions in the press for subsequent bars other than that shown in FIGURE 4. The positions shown in FIGURES 6 and 7 may be used in order to spread wear of the die.

If spring eyes are not required, a cylindrical bar of rolled steel stock is machined so as to taper towards each end. Accurate diameters along the length of the bar are achieved by the machining and surface cracks and scale are removed.

The bar is then heated to forging temperature and then formed to the required shape and dimensions in a die under a forging press. The shape of the die is such as to form the bar into a spring leaf tapered in thickness towards each end. The loss of heat is small and hardening and tempering are done immediately after forming without re-heating of the leaf.

The descriptions given above of making a spring leaf with eyes and a spring leaf without eyes according to the invention are by way of example only and may be modified in detail.

For instance, in the case of the leaf having spring eyes a brief re-heating of the leaf could precede the incurving of the end portions and the hardening and tempering could follow the formation of the eyes immediately without any re-heating of the leaf.

A leaf having uniform thickness along its length could be made, in another modification, by forming a heated cylindrical bar of rolled stock to the required shape and dimensions in a die under pressure, the die being shaped so as to form a leaf of uniform thickness.

Drawn stock may be used as the material from which the leaf is formed instead of rolled stock.

Furthermore, the leaf may be formed from a bar of cross-section other than circular, for example rectangular.

The tapering of the bar before forging may be done by hammering instead of machining and the forming of the leaf in the die may be done under a forging hammer instead of a forging press.

Furthermore, the bar may be heated under a protective or reducing atmosphere to a temperature well above normal forging temperature and the forging, forming of the eyes, hardening and tempering performed without re-heating the bar. After hardening and tempering, the spring leaf may be shot-peened or sand blasted and may be coated to prevent corrosion.

By making spring leaves in this way, the number of operations and time and heat required are reduced. Also, the risk of decarbonisation of the material of the leaf is reduced since the number of times the material is heated is kept to a minimum.

Spring leaves made in this way have forged longitudinal edges which ensure that the leaves have very good resistance to fatigue. Furthermore, the forging operation compacts the outer layers of the material of the leaves which also ensures good fatigue resistance. The surfaces of spring leaves made in this way are very smooth, free from fine cracks and scale and have a fine structure showing excellent laminar grain flow.

Spring leaves made in this way have accurate dimensions and consequently have excellent characteristics since the dimensions of the leaves are very close to those necessary for designed characteristics.

I claim:

1. A method of making a spring leaf having tapered thickness from the centre by reducing the diameter of the end portions of a cylindrical rod, pressing the rod in a laterally and longitudinally unconfining die to obtain a leaf of the required tapered shape and dimensions, reheating the leaf, rolling spring eyes at each end of the leaf and then hardening, tempering and peening the leaf.

2. A method according to claim 1 in which the end portions of the rod are reduced by machining.

References Cited in the file of this patent

UNITED STATES PATENTS

| | | |
|---|---|---|
| 1,974,662 | Lyman | Sept. 25, 1934 |
| 2,101,195 | Randall | Dec. 7, 1937 |
| 2,608,752 | Schilling | Sept. 2, 1952 |
| 2,770,034 | Lyon | Nov. 13, 1956 |
| 2,968,093 | Lyon | Jan. 17, 1961 |

FOREIGN PATENTS

| | | |
|---|---|---|
| 14,930 | Great Britain | Aug. 24, 1889 |
| 20,846 | Great Britain | Sept. 9, 1915 |